United States Patent
Wang et al.

(10) Patent No.: US 11,091,117 B2
(45) Date of Patent: Aug. 17, 2021

(54) AIRBAG INFLATOR WITH FLOW-GUIDING LOOP

(71) Applicant: MOSA INDUSTRIAL CORPORATION, Yunlin County (TW)

(72) Inventors: Teh-Hsin Wang, Yunlin County (TW); Long-Ming Tsai, Taipei (TW); Chia-Jung Lin, Taichung (TW); Han-Le Wang, Chiayi County (TW); Yun-Hsien Lin, Taichung (TW)

(73) Assignee: Mosa Industrial Corporation, Yunlin County (TW)

( * ) Notice: Subject to any disclaimer, the term of this patent is extended or adjusted under 35 U.S.C. 154(b) by 88 days.

(21) Appl. No.: 16/363,093

(22) Filed: Mar. 25, 2019

(65) Prior Publication Data

US 2020/0114861 A1    Apr. 16, 2020

(30) Foreign Application Priority Data

Oct. 16, 2018  (TW) .................................. 107136369

(51) Int. Cl.
*B60R 21/26*   (2011.01)
*B60R 21/264*  (2006.01)
*F42B 3/04*    (2006.01)

(52) U.S. Cl.
CPC .............. *B60R 21/264* (2013.01); *F42B 3/04* (2013.01); *B60R 2021/26011* (2013.01)

(58) Field of Classification Search
CPC ......... B60R 21/264; B60R 2021/26011; B60R 21/261
See application file for complete search history.

(56) References Cited

U.S. PATENT DOCUMENTS

| | | | | |
|---|---|---|---|---|
| 3,964,394 A | * | 6/1976 | Wolf | B60R 21/261 102/531 |
| 5,584,506 A | * | 12/1996 | Van Wynsberghe | B60R 21/261 280/736 |
| 5,992,874 A | * | 11/1999 | Sugiyama | B60Q 5/003 280/728.2 |
| 6,257,617 B1 | * | 7/2001 | McFarland | B60R 21/261 280/736 |
| 8,297,653 B2 | * | 10/2012 | Smith | B60R 21/2644 280/741 |

(Continued)

FOREIGN PATENT DOCUMENTS

JP        4957520 B2 *   6/2012

*Primary Examiner* — Ruth Ilan
(74) *Attorney, Agent, or Firm* — Wang Law Firm, Inc.

(57) ABSTRACT

An airbag inflator is provided, including an inflator module, an exhaust hood, a filter element, exhaust holes, and a flow-guiding loop. The exhaust hood corresponds to one end of the inflator module to form an accommodating space in a concave shape, and the exhaust hood is set on the inflator module by the accommodating space. The filter element is disposed on the sidewall of the exhaust hood and covers the exhaust holes. The exhaust holes are disposed on the sidewall of the exhaust hood and are adjacent to the exhaust hood opposite to one end of the inflator module. One side of the flow-guiding loop is attached to the exhaust hood corresponding to one side of the inflator module, and the other side of the flow-guiding loop extending to the inflator module to form an annular convex rib.

6 Claims, 4 Drawing Sheets

(56) References Cited

U.S. PATENT DOCUMENTS

| | | | | |
|---|---|---|---|---|
| 9,221,420 B2 * | 12/2015 | Laubacher | ............ | B60R 21/261 |
| 2005/0161924 A1 * | 7/2005 | Schoenhuber | ........ | B60R 21/261 |
| | | | | 280/741 |
| 2010/0071580 A1 * | 3/2010 | Nakayasu | ............. | B60R 21/261 |
| | | | | 102/530 |
| 2013/0305516 A1 * | 11/2013 | Overton | ................. | B21D 39/00 |
| | | | | 29/522.1 |
| 2014/0123869 A1 * | 5/2014 | Ukita | ................... | B60R 21/264 |
| | | | | 102/530 |
| 2014/0265276 A1 * | 9/2014 | Fischer | .............. | B60R 21/2644 |
| | | | | 280/741 |

* cited by examiner

AIRBAG INFLATOR WITH FLOW-GUIDING LOOP

CROSS-REFERENCE TO RELATED APPLICATION

This application claims priority from Taiwan Patent Application No. 107136369, filed on Oct. 16, 2018, in the Taiwan Intellectual Property Office, the content of which is hereby incorporated by reference in its entirety for all purposes.

BACKGROUND OF THE INVENTION

1. Field of the Invention

The present invention relates to an airbag inflator, more particularly to an airbag inflator with a flow-guiding loop with a disposition of a flow-guiding element in an accommodating space of an exhaust hood, which facilitates the change of the airflow route generated by the inflator device to further increase the possibility of the residue depositing in the inflator device.

2. Description of the Related Art

A supplement inflatable restraint system (SRS), also known as an airbag, is a car safety device currently known to people skilled in the prior art. In the unfortunate case of a car accident, this system ensures that passengers get cushioning space during the impact and reduce the possible damage to the passengers caused by the collision by quickly aerifying the airbag to make the airbag inflate in a short time.

The method used in a conventional inflator for an automobile airbag mixes high-temperature and high-pressure gas generated by igniting gas generant with low-temperature and high-pressure gas in a gas cylinder and guiding the mixed gas into the airbag. However, residue will be generated in the process of generating and exporting the gas. When too much residue is imported into the airbag with the airflow via the exhaust hole, residue at high temperatures may damage the airbag and cause further safety issues.

In view of the aforementioned problems, the present invention has made an improvement on an airbag inflator which cannot effectively reduce the probability of exporting the residue out of the exhaust hood in order to solve the problems found in conventional airbag inflators.

SUMMARY OF THE INVENTION

Accordingly, the present invention aims to provide an airbag inflator including an inflator module, an exhaust hood, a filter element, exhaust holes, and a flow-guiding loop, wherein one side of the flow-guiding loop is attached to the exhaust hood corresponding to one side of the inflator module, and the other side of the flow-guiding loop extends to the inflator module to form an annular convex rib. When the inflator module generates the first airflow and the residue, the flow-guiding loop and the annular convex rib can guide the first airflow and the residue to the inflator module to prevent the first airflow and the residue from being directly exported by the exhaust holes. The filter element may also be disposed on the sidewall of the exhaust hood corresponding to the inflator module, and the inflator module is covered on the exhaust hole. In so doing, when the residue flows to the exhaust hole, a part of the residue will be left in the filter element, thus effectively reducing the amount of the residue exported via the exhaust hole.

On the basis the purpose, the present invention provides an airbag inflator including an inflator module, an exhaust hood, exhaust holes, and a flow-guiding loop. The exhaust hood corresponds to one end of the inflator module to form an accommodating space in a concave shape, and the exhaust hood is set on the inflator module by the accommodating space. The exhaust holes are disposed on a sidewall of the exhaust hood and are adjacent to the exhaust hood opposite to one end of the inflator module. One side of the flow-guiding loop is attached to the exhaust hood corresponding to one side of the inflator module, and the other side of the flow-guiding loop extends to the inflator module to form an annular convex rib. Wherein, when the inflator module is activated, the inflator module exports the first airflow and the residue toward one side of the exhaust hood, the other side of the flow-guiding loop and the annular convex rib guide the first airflow and the residue to flow toward the inflator module, and the first airflow and the residue are exported out of the exhaust hood via the exhaust holes.

Preferably, the airbag inflator may include a filter element, wherein the filter element is disposed on the sidewall of the exhaust hood corresponding to one side of the inflator module and covers the exhaust holes.

Preferably, the first airflow may flow from the filter element to the exhaust holes and be exported out of the exhaust hood from the exhaust holes.

Preferably, the flow-guiding loop may guide the residue to flow to the inflator module to make the residue left in the filter element.

Preferably, the exhaust hood may include a fixing part, and the fixing part may be disposed on the exhaust hood corresponding to the end of the inflator module.

Preferably, the fixing part may include locking holes.

Preferably, the annular convex rib may be adjacent to the sidewall of the exhaust hood corresponding to one side of the inflator module, and a gap may be disposed between the annular convex rib and the sidewall of the exhaust hood.

Preferably, the inflator module may include an ignitor part, a steering part, a pyrotechnic part, and an airflow-guiding part; the ignitor part, the steering part, the pyrotechnic part, and the airflow-guiding part are disposed in the inflator module.

Preferably, one end of the ignitor part is connected to one end of the steering part, the other end of the steering part is connected to one end of the pyrotechnic part, the other end of the pyrotechnic part is connected to one end of the airflow-guiding part, and the other end of the airflow-guiding part corresponds to the side of the exhaust hood.

Preferably, when the ignitor part is activated, the ignitor part generates a second airflow, the second airflow flows to the pyrotechnic part via the steering part; when the pyrotechnic part includes the second airflow, the pyrotechnic part generates the first airflow and the residue, and the first airflow and the residue are exported out of the inflator module from the other end of the airflow-guiding part.

In sum, the airbag inflator of the present invention has the advantages as follows:

(1) Compared with conventional airbag inflators, the airbag inflator of the present invention includes a flow-guiding loop, wherein one side of the flow-guiding loop is attached to the exhaust hood corresponding to one side of the inflator module, and the other side of the flow-guiding loop extends to the inflator module to form an annular convex rib. When the inflator module generates the first airflow and the residue, the flow-guiding loop and the annular convex rib may guide the first airflow and the residue to the inflator module to prevent the first airflow and the residue from being directly exported by the exhaust holes. This further reduces the possibility of damaging the airbag when making contact with the residue at high temperature.

(2) For the airbag inflator of the present invention, the filter element may be disposed on the sidewall of the exhaust hood corresponding to the inflator module, and the filter element is covered on the exhaust holes. In so doing, when the residue flows to the exhaust holes, a part of the residue will be left in the filter element, thus effectively reducing the amount of the residue exported via the exhaust holes.

To make the aforementioned purposes, technical features, and gains after actual implementation more obvious and understandable, the following description shall be explained in more detail with reference to the preferred embodiments together with related figures.

DESCRIPTION OF THE PREFERRED EMBODIMENTS

In the present invention, it should be noted that the orientation or positional relationship regarding the terms "in," "out," "down," and the like is based on the orientation or positional relationship as shown in the figures, which is only for ease of describing the present invention and simplifying the description. The description does not indicate or imply that the referred devices or elements must have a particular orientation, construction, and operation. Therefore, it should not be understood as a restriction on the present invention.

In the present invention, it should be noted that the terms "dispose," "set," "attach," "cover" "fill," "guide," and "export," "lock," and "activate" should be considered to be general understandings unless there are specific regulations or restrictions. The specific meanings of the aforementioned terms in the present invention shall specifically be understood by a person skilled in the art.

The embodiments of the airbag inflator 140 of the present invention are explained with reference to the related figures. For ease of understanding, the same elements in the following embodiments are explained in accordance with the same symbols.

Figure 1:
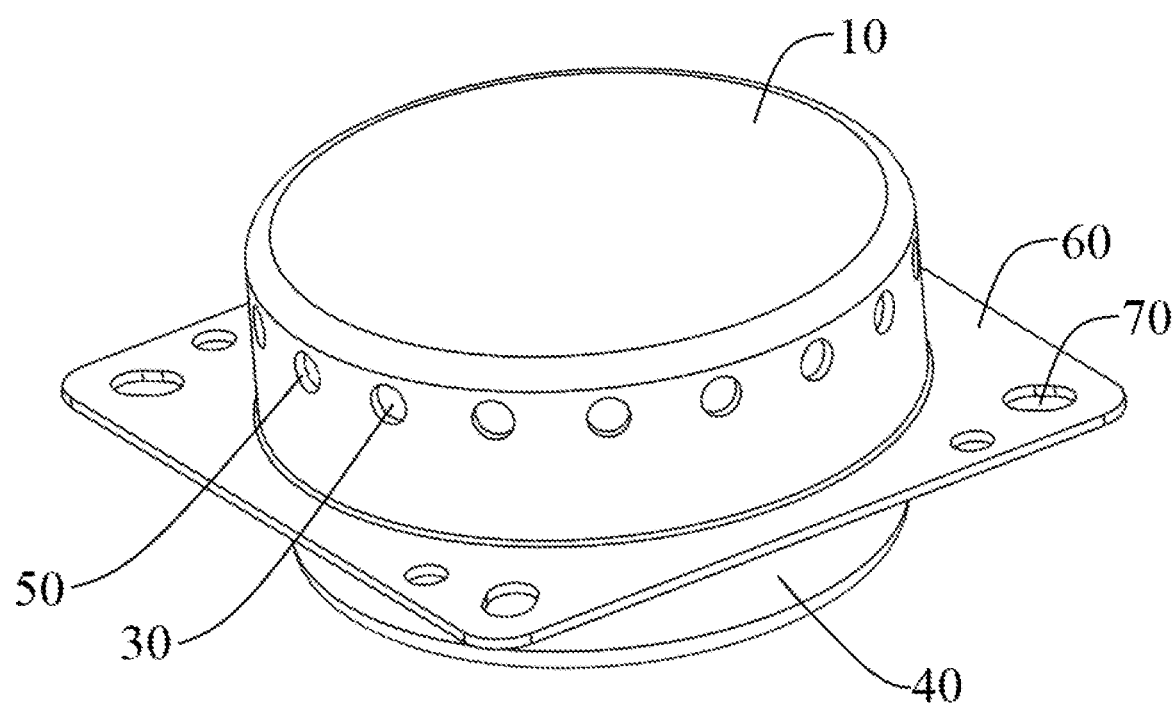
FIG. 1 depicts an assembly diagram according to the airbag inflator of the present invention.
Figure 2:
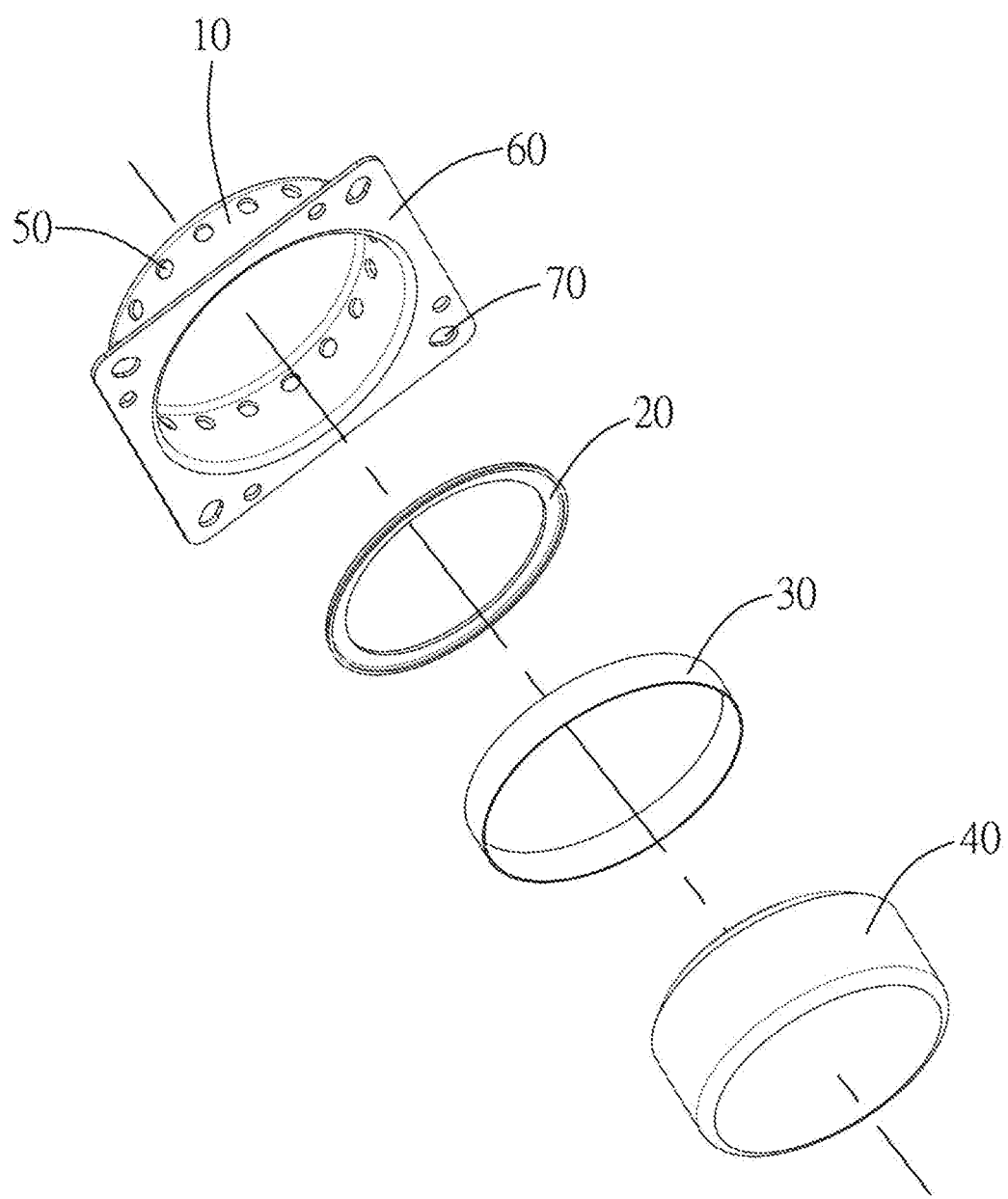
FIG. 2 depicts an explosion diagram according to the airbag inflator of the present invention.
Figure 3:
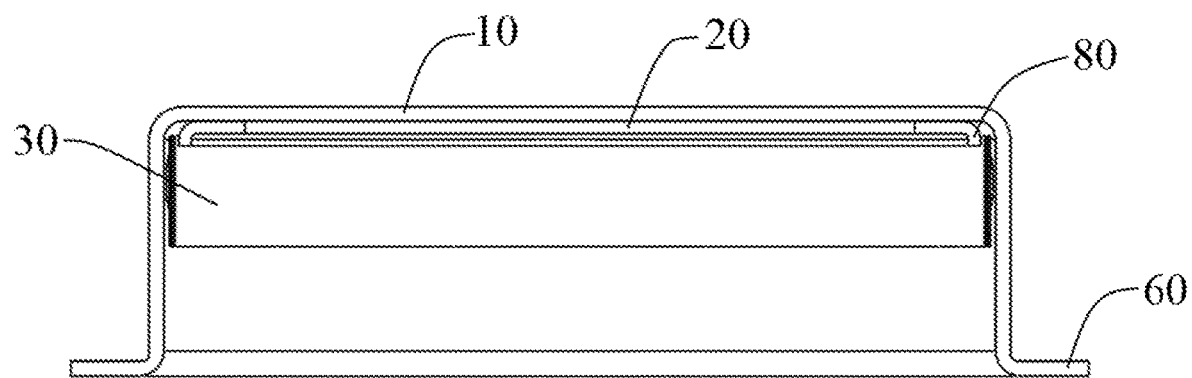
FIG. 3 depicts a sectional diagram of the assembled exhaust hood, flow-guiding loop, and filter element according to the airbag inflator of the present invention.

Please refer to FIG. 1, FIG. 2, and FIG. 3, which respectively depict an assembly diagram, an explosion diagram, and a sectional diagram of the assembled exhaust hood, flow-guiding loop, and filter element according to the airbag inflator of the present invention. As shown, the airbag inflator 140 includes an inflator module 40, an exhaust hood 10, exhaust holes 50, and a flow-guiding loop 20. The exhaust hood 10 corresponds to one end of the inflator module 40 to form an accommodating space in a concave shape, and the exhaust hood 10 is set on the inflator module 40 by the accommodating space. The exhaust holes 50 are disposed on a sidewall of the exhaust hood 10 and are adjacent to the exhaust hood 10 opposite to one end of the inflator module 40. One side of the flow-guiding loop 20 is attached to the exhaust hood 10 corresponding to one side of the inflator module 40, and the other side of the flow-guiding loop 20 extends to the inflator module 40 to form an annular convex rib 80. Wherein, when the inflator module 40 is activated, the inflator module 40 exports the first airflow 131 and the residue toward one side of the exhaust hood 10, the other side of the flow-guiding loop 20 and the annular convex rib 80 guide the first airflow 131 and the residue to flow toward the inflator module 40, and the first airflow 131 and the residue are exported out of the exhaust hood 10 via the exhaust holes 50.

When the exhaust hood 10 is set on the inflator module 40 by the accommodating space, one end of the inflator module 40 is positioned in the accommodating space, the other end of the inflator module 40 is positioned out of the exhaust hood 10, and the exhaust holes 50 are not shaded or covered by the inflator module 40. Nonetheless, the aforementioned descriptions are only explained as examples and not restricted thereto.

The airbag inflator 140 includes a filter element 30. The filter element 30 is disposed on the sidewall of the exhaust hood 10 corresponding to one side of the inflator module 40 and covers the exhaust holes 50.

When the inflator module 40 is activated, the inflator module 40 exports the first airflow 131 and the residue toward one side of the exhaust hood 10, the other side of the flow-guiding loop 20 and the annular convex rib 80 guide the first airflow 131 and the residue to flow toward the inflator module 40, and the first airflow 131 flows to the exhaust holes 50 via the filter element 30 and is exported out of the exhaust hood 10 via the exhaust holes 50, which is then filled in the airbag. Nonetheless, the aforementioned descriptions are only explained as examples and not restricted thereto.

When the other side of the flow-guiding loop 20 and the annular convex rib 80 guide the first airflow 131 and the residue to flow toward the inflator module 40, a part of the residue may be deposited in the accommodating space, and the other part may be left in the filter element 30. This may effectively reduce the amount of the residue exported via the exhaust holes 50 and further effectively prevent too many residues at a high temperature from flowing to the airbag together with the first airflow 131. Nonetheless, the aforementioned descriptions are only explained as examples and not restricted thereto.

The exhaust hood 10 includes a fixing part 60, and the fixing part 60 is disposed in exhaust hood 10 corresponding to one end of the inflator module 40.

The fixing part 60 includes locking holes 70, wherein each of the locking holes 70 differs in diameter, and each of the locking holes 70 is correspondingly locked to the bearing plate of the airbag by a locking element.

The annular convex rib 80 is adjacent to the sidewall of the exhaust hood 10 corresponding to one side of the inflator module 40, wherein the positions of the annular convex rib 80 and the flow-guiding loop 20 corresponding to one side of the inflator module 40 are provided with round corners. The round corners are advantageous to guiding the first airflow 131 and the residue to the inflator module 40. Owing to the gap between the annular convex rib 80 and the sidewall of the exhaust hood 10, when the first airflow 131 and the residue flow toward the inflator module 40, it is effective to prevent the first airflow 131 and the residue from being directly exported via the exhaust holes 50. This may allow the residue to be left in the accommodating space. Nonetheless, the aforementioned descriptions are only explained as examples and not restricted thereto.

The inflator module 40 may include an ignitor part 90, a steering part 100, n pyrotechnic 110, and an airflow-guiding part 120; the ignitor part 90, the steering part 100, the pyrotechnic part 110, and the airflow-guiding part 120 are disposed in the inflator module 40.

The ignitor part 90 is connected to one end of the steering part 100, the other end of the steering part 100 is connected to one end of the pyrotechnic part 110, the other end of the pyrotechnic part 110 is connected to one end of the airflow-guiding part 120, and the other end of the airflow-guiding part 120 corresponds to one side of the exhaust hood 10.

Figure 4:
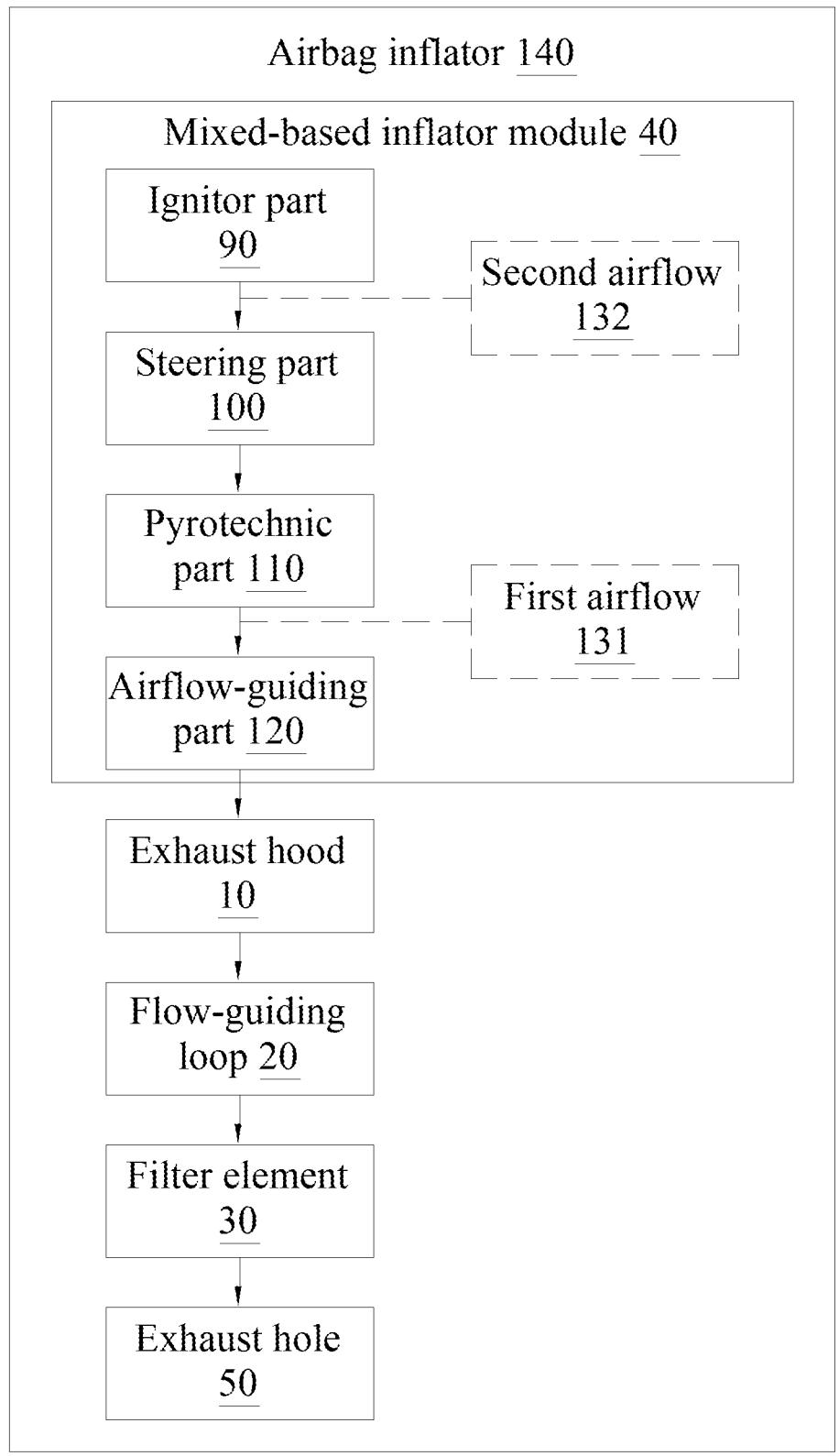
FIG. 4 depicts an airflow route diagram according to the airbag inflator of the present invention.

Please refer to FIG. 4, which depicts an airflow route diagram according to the airbag inflator of the present invention. As shown, when the ignitor part 90 of the inflator module 40 is activated, the ignitor part 90 generates the second airflow 132. The second airflow 132 flows to the pyrotechnic part 110 via the steering part 100, wherein the pyrotechnic part 110 includes gas generant. The gas generant may be a non-azide gas-producing agent. When the second airflow 132 comes into contact with the gas generant, the gas generant may burn and further generate a high-temperature gas. Moreover, the high-temperature gas is further combined with the low-temperature gas which already exists inside to form a moderate-temperature but high-pressure gas. This moderate-temperature but high-pressure gas is then the first airflow 131. In addition, the residue may be generated in the process of burning the gas generant. The first airflow 131 and the residue are exported out of the inflator module 40 via the other end of the airflow-guiding part 120. Nonetheless, the aforementioned descriptions are only explained as examples and not restricted thereto.

For instance, when the ignitor part 90 of the inflator module 40 is activated when receiving a ignitor signal, the ignitor part 90 will generate the second airflow 132. Next, the second airflow 132 flows to the pyrotechnic part 110 via the steering part 100 and comes into contact with the gas generant in the pyrotechnic part 110 to generate the first airflow 131 and the residue. The first airflow 131 and the residue are exported out of the inflator module 40 and to the accommodating space of the exhaust hood 10 via the other end of the airflow-guiding part 120. Then, the first airflow 131 and the residue are guided to the flow-guiding loop 20 via the exhaust hood 10 corresponding to one side of the inflator module 40. Afterward, the first airflow 131 and the residue are guided to the inflator module 40 via the flow-guiding loop 20 corresponding to one side of the inflator module 40 and the extended and formed annular convex rib. Because of the gap between the annular convex rib 80 and the sidewall of the exhaust hood 10, when the first airflow 131 and the residue flow toward the inflator module 40, it is effective to prevent the first airflow 131 and the residue from being directly exported via the exhaust holes 50. This may allow the residue to be left in the accommodating space. Nonetheless, the aforementioned descriptions are only explained as examples and not restricted thereto.

For instance, when the first airflow 131 and the residue is guided to the inflator module 40 via the flow-guiding loop 20 and the annular convex rib 80, the first airflow 131 and the residue may be exported via the exhaust holes 50; when the exhaust holes 50 are covered on the filter element 30, a part of the residue may be effectively left in the filter element 30, which further effectively reduces the amount of the residue exported via the exhaust holes 50. Nonetheless, the aforementioned descriptions are only explained as examples and not restricted thereto.

Compared with conventional airbag inflators, the airbag inflator 140 of the present invention includes a flow-guiding loop 20, wherein one side of the flow-guiding loop 20 is attached to the exhaust hood 10 corresponding to one side of the inflator module 40, and the other side of the flow-guiding loop 20 extends to the inflator module 40 to form an annular convex rib 80. When the inflator module 40 generates the first airflow 131 and the residue, the flow-guiding loop 20 and the annular convex rib 80 may guide the first airflow 131 and the residue to the inflator module 40, and the first airflow 131 and the residue are then exported via the exhaust holes 50. This may make most of the residue deposited in the inflator in this flowing process and effectively prevent too many residues from flowing to the airbag together with the first airflow 131, thus reducing the possibility of damaging the airbag when making contact with the residue at high temperature.

For the airbag inflator 140, a filter element 30 may be disposed on the sidewall of the exhaust hood 10 corresponding to one side of the inflator module 40, and filter element 30 may cover the exhaust holes 50. In so doing, when the residue flows to the exhaust hole 50, a part of the residue will be left in the filter element 30, thus effectively reducing the amount of the residue exported via the exhaust holes 50. Nonetheless, the aforementioned descriptions are only explained as examples and not restricted thereto.

The above description is merely illustrative rather than restrictive. Any equivalent modification or alteration without departing from the spirit and scope of the present invention should be included in the appended claims.

What is claimed is:

1. An airbag inflator, comprising:
   an inflator module;
   an exhaust hood set on the inflator module so as to form an accommodating space in a concave shape; wherein the exhaust hood includes a closed end and a sidewall extending from the closed end of the exhaust hood towards the inflator module;
   a plurality of exhaust holes disposed on the sidewall of the exhaust hood at the sidewall proximal to the closed end of the exhaust hood; and
   a flow-guiding loop, one side thereof attached to the closed end of the exhaust hood, and the other side of the flow-guiding loop extending to the inflator module to form an annular convex rib;
   wherein the annular convex rib and the flow-guiding loop includes round corners at positions corresponding to the side of the flow-guiding loop attached to the exhaust hood and a gap is disposed between the annular convex rib and the sidewall of the exhaust hood;
   wherein when the inflator module is activated, the inflator module guides a first airflow and at least one residue toward the exhaust hood, the other side of the flow-guiding loop and the annular convex rib guide the first airflow and the at least one residue to flow toward the inflator module, and the first airflow is guided out of the exhaust hood from the plurality of exhaust holes and the at least one residue is left in the concave shape of the accommodating space.

2. The airbag inflator according to claim 1, comprising a filter element, wherein the filter element is disposed on the sidewall of the exhaust hood and covers the plurality of exhaust holes.

3. The airbag inflator according to claim 2, wherein the first airflow flows from the filter element to the plurality of exhaust holes and is exported out of the exhaust hood from the plurality of exhaust holes.

4. The airbag inflator according to claim 3, wherein the flow-guiding loop guides the at least one residue to flow to the inflator module, and the at least one residue is left in the filter element.

5. The airbag inflator according to claim 1, wherein the exhaust hood comprises a fixing part, and the fixing part is extended from the sidewall of the exhaust hood.

6. The airbag inflator according to claim 5, wherein the fixing part comprises a plurality of locking holes.

\* \* \* \* \*